(12) United States Patent
Adam et al.

(10) Patent No.: US 6,309,014 B1
(45) Date of Patent: Oct. 30, 2001

(54) ROOF ARRANGEMENT

(75) Inventors: Wolfgang Adam, Nagold; Volker Richters, Leinfelden-Echterdingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/373,990

(22) Filed: Aug. 16, 1999

(30) Foreign Application Priority Data

Aug. 14, 1998 (DE) ................................. 198 36 853

(51) Int. Cl.$^7$ ....................................................... B60J 7/185
(52) U.S. Cl. ............................................................. 296/224
(58) Field of Search ..................................... 296/223, 224

(56) References Cited

U.S. PATENT DOCUMENTS

| | | | |
|---|---|---|---|
| 3,913,970 | * 10/1975 | Jardin et al. | 296/224 X |
| 4,363,515 | 12/1982 | Lutz et al. | 296/222 |
| 5,090,767 | * 2/1992 | Schreiter et al. | 296/224 X |
| 5,836,642 | * 11/1998 | Salz | 296/220.01 X |
| 5,897,160 | * 4/1999 | Reihl et al. | 296/220.01 |

FOREIGN PATENT DOCUMENTS

| | | | |
|---|---|---|---|
| 917 594 | 9/1954 | (DE) | . |
| 2940565 | 4/1981 | (DE) | . |
| 3223300 | * 12/1983 | (DE) | 296/223 |
| 44 15 649 C1 | 6/1995 | (DE) | . |
| 197 56 020 | 12/1997 | (DE) | . |
| 0 794 077 | 9/1997 | (EP) | . |
| 2 258 848 | 2/1993 | (GB) | . |
| 56-67624 | 6/1981 | (JP) | . |

* cited by examiner

*Primary Examiner*—Dennis H. Pedder
(74) *Attorney, Agent, or Firm*—Crowell & Moring LLP

(57) ABSTRACT

A roof arrangement for a roof aperture of a motor vehicle. The roof arrangement has at least one roof section which is mounted on a guide to move in the longitudinal direction of the vehicle. The at least one roof section is connected to a fixing device which secures the roof section by a positive and/or non-positive fitting relative to the guide in the event of a vehicle deceleration caused by a collision.

28 Claims, 2 Drawing Sheets

ROOF ARRANGEMENT

BACKGROUND AND SUMMARY OF THE INVENTION

This application claims the priority of 198 36 853.4, filed Aug. 14, 1998, the disclosure of which is expressly incorporated by reference herein.

The invention relates to a roof arrangement for a roof aperture of a motor vehicle, having at least one roof section which is mounted in a guide to move in a longitudinal direction of the vehicle.

DE 44 15 649 C1 discloses a slatted roof for a car which possesses a plurality of slatted roof sections mounted via a push-out and guide mechanism in a roof aperture of the car and displaceable in the longitudinal direction of the vehicle. A supporting slide arranged in a guide rail is assigned to each slatted roof section. Each supporting slide has a locking member which can be actuated by an adjacent slatted roof section. The locking member engages into a recess on the guide rail side when the corresponding support slide has reached a particular position.

DE-C 917 594 discloses a telescopic canopy top for a motor vehicle having a plurality of roof hoops which are displaceable in a guide in the longitudinal direction of the vehicle. The foremost part of the hoops, in the direction of travel, can be locked by a latch device in the closed position of the canopy roof on the vehicle body.

The object of the present invention is to provide a roof arrangement of the type referred to initially in which at least one roof section is secured in every position against escaping from the guide in the event of a vehicle collision.

This and other objects are achieved by at least one roof section being assigned a fixing device which secures the roof section by positive and/or non-positive fitting relative to the guide in the event of a vehicle deceleration caused by a collision. The fixing device individually provided for each of the at least one roof section, brakes and/or blocks, in each position of the roof section, automatically with rapid reaction, an undesireable movement of the roof section in the guide. To this end, the fixing device is so designed so that, in the event of a vehicle deceleration in excess of a predetermined threshold value, it prevents or at least slows movement of the roof section relative to the guide.

Preferably, the fixing device is arranged on a support slide which is movable in the guide and supports the roof section. Normal opening or closing movements of the roof arrangement are not prevented by the fixing device. The guide is, furthermore, of such strong design that, if the fixing device engages upon it, it is not sufficiently deformed for the roof sections to be able to escape from the guide.

In preferred embodiments of the invention, the fixing device has a securing member which is mounted to move relative to the roof section and, in the event of a vehicle deceleration caused by a collision, is deflected out of its position of rest and engages on the guide. The securing member may be designed as a friction or latching member. In the event of a sharp deceleration of the vehicle as a result of a collision, the securing member is moved from a rest position, in which movement of the roof section is permitted, into an operating position in which movement of the roof section is prevented.

According to a further advantageous feature and preferred embodiments of the invention, the securing member is mounted so as to move by pivoting about a bolt oriented in the transverse direction of the vehicle. The securing member moves from the rest position into the operating position by pivoting about the bolt.

According to a further advantageous feature and preferred embodiments of the invention, the securing member is designed as a friction member which, on the guide side, is assigned a friction surface extending in the longitudinal direction of the vehicle. In the operating position, the friction member slides or adheres, irrespective of the position of the roof section, on the friction surface extending parallel to the guide, as a result of which movement of the roof section is braked or prevented.

According to a further advantageous feature and preferred embodiments of the invention, the securing member is designed as a latching member which, on the side of the guide, is assigned a recess for engagement by positive fitting. The recess is designed so that it provides the latching member with a stop surface acting in the direction of travel of the motor vehicle. The latching member engages, in its operating position, into the recess and so blocks the movement of the roof section in the direction of travel by positive fitting.

According to a further advantageous feature and preferred embodiments of the invention, the fixing apparatus possesses an inertia member which is mounted to move relative to the roof section and, in the event of a vehicle deceleration caused by a collision, is deflected by its own mass inertia forces out of its position of rest. The inertia member moves, as a result of the deflection, into an operating position in which it either triggers an activation of the securing member or itself actuates the securing member.

According to a further advantageous feature and preferred embodiments of the invention the fixing device possesses a lever mounted to move by pivoting on a bolt oriented in the transverse direction of the vehicle, on which lever the inertia element is arranged at a distance from the bolt in the vertical direction of the vehicle. The inertia member can be designed separately from or integrally with the lever. As a result of the proposed arrangement, inertia forces acting on the inertia member cause a torque relative to the bolt, which is passed into the lever. The part of the lever bridging the space between the bolt and the inertia member here represents the relevant lever arm, and the inertia member may be arranged above or below the bolt.

Further advantages and features of the invention are apparent from the claims and from the description which follows, in which a preferred example of embodiment of the invention is shown with reference to a drawing.

DETAILED DESCRIPTION OF THE DRAWINGS

Figure 1:
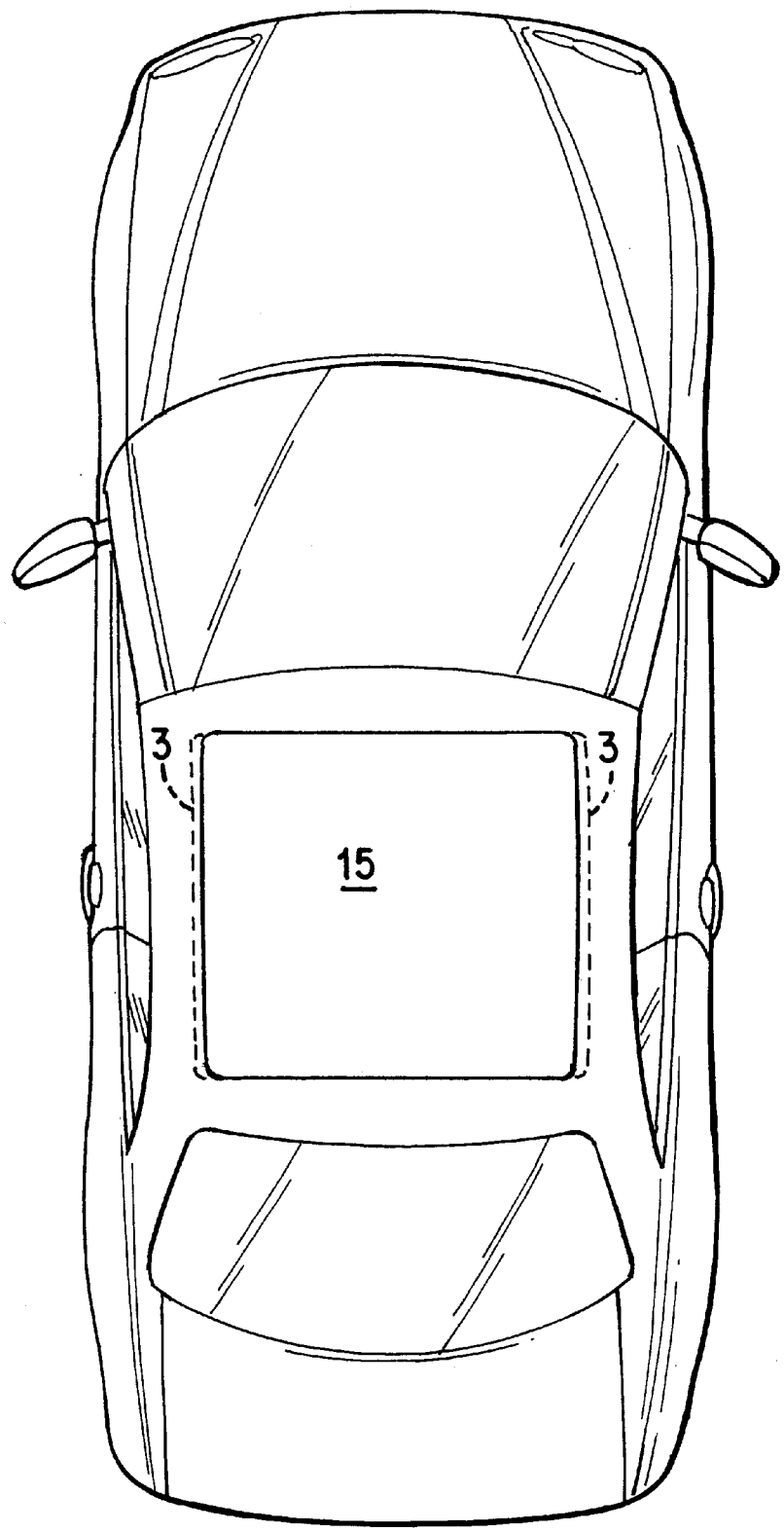
FIG. 1 illustrates a top view of a motor vehicle including the roof arrangement shown schematically.

As shown in FIG. 1, a roof arrangement for a motor vehicle, in the form of a slatted roof 1, has a plurality of roof sections in the form of slatted roof sections 2 which are arranged to be movable in a guide 3 in the longitudinal direction of the vehicle. In a closed position, slatted roof section 2 cover a roof aperture of the motor vehicle. In the figure, a section of the slatted roof 1 is shown, illustrating the mounting of a slatted roof section 2 on the guide 3 via a support slide 4 and a fixing device 5 according to the invention.

Figure 2:
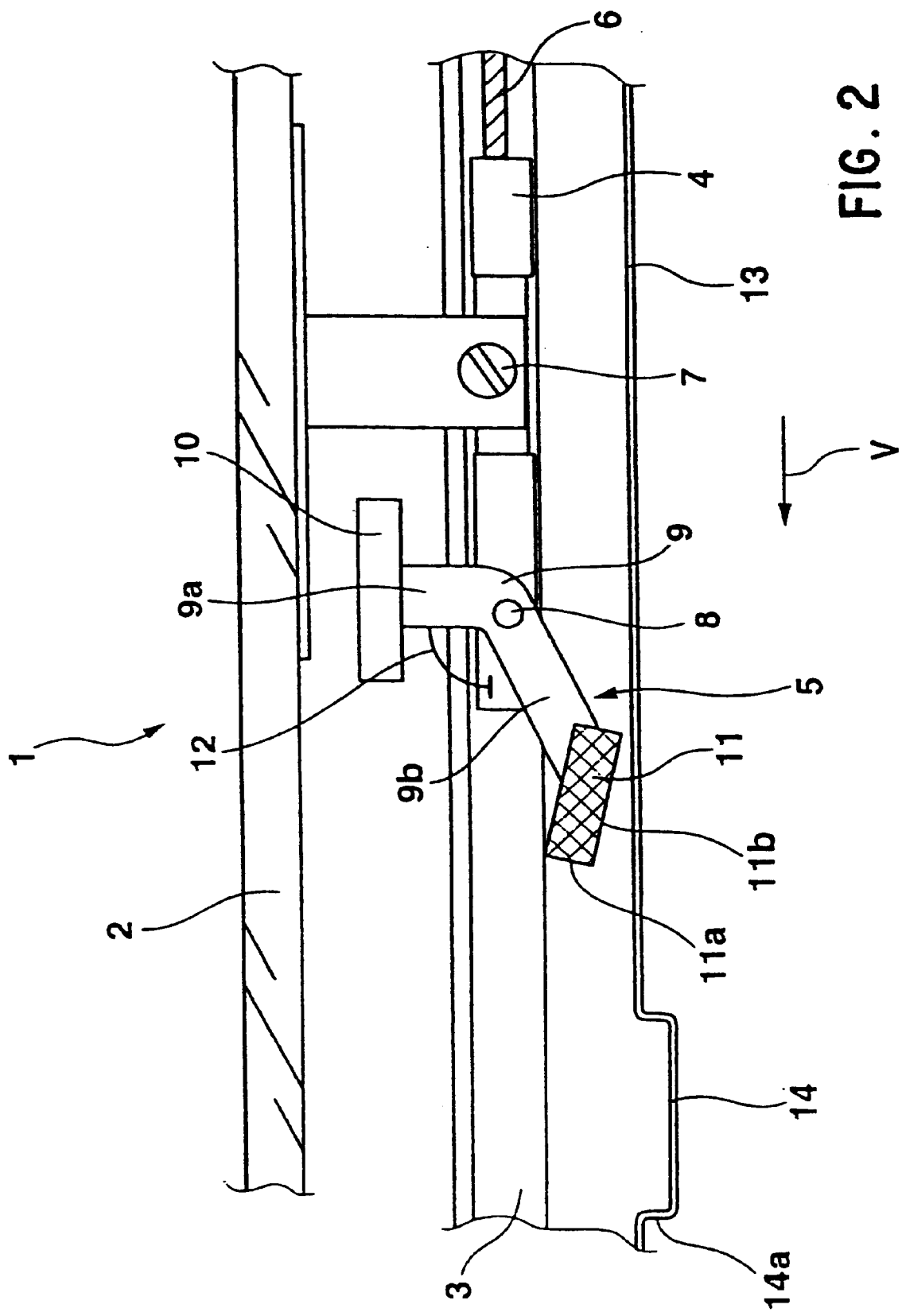
FIG. 2 illustrates in a diagrammatic lateral view, a section from a roof arrangement according to the invention.

As shown in FIG. 2, the guide 3 is formed, in particular, by two guide sections which extend on both longitudinal sides of the roof aperture 15, in the marginal region thereof. Each of the guides receives one of two support slides 4 of each slatted roof section 2. Each slatted roof section 2 thus has a support slide 4 on each of its opposite short sides. For the sake of simplicity, reference will always be made in what follows to one guide and one support slide, the description applying identically for both longitudinal sides of the roof aperture.

The support slide 4 is arranged to be linearly displaceable in the guide 3 in the longitudinal direction of the vehicle, parallel to the arrow V. To this end, the support slide 4 is connected to a rigid drive cable 6 via which translatory forces can be introduced into the support slide. A bolt connection 7 is provided on the support slide 4 through which the slatted roof section 2 is pivotably fixed on the support slide 4. The fixing device 5 is connected to the support slide 4 via a further bolt connection 8.

In the event of a frontal vehicle collision, in which a sharp deceleration of the vehicle takes place, high inertia forces arise and act upon the slatted roof section 2 and on the support slide 4. These inertia forces may result in the slatted roof sections 2, including the support slides 4, escaping from the guide. In this case, both the guide 3 and the drive cable 6 may be destroyed, so that an uncontrolled catapult movement of the roof sections 2 may arise.

Such an event is prevented by the arrangement according to the invention of the fixing device 5, as follows. Such a fixing device may be assigned to each slatted roof section or merely to a single roof section or to several. If the fixing device 5 is assigned to one individual slatted roof section, it engages on the foremost slatted roof section 2, on which the drive also engages. Blocking the foremost slatted roof section is then able to block the subsequent slatted roof sections in the guide 3.

The fixing device 5 comprises a two-armed lever 9 which is fixed on the support slide 4 so as to be able to pivot about the bolt 8, oriented in the transverse direction of the vehicle. The lever 9 has a position of rest shown in the figure, in which a first lever arm 9a extends in the direction of the vertical axis of the vehicle and is positioned above the bolt 8. A second lever arm 9b extends, starting from the bolt 8, obliquely in the direction of travel and downwards. Arranged at the end of the first lever arm 9a is an inertia member 10 and at the end of the second lever arm 9b a securing member 11. The inertia member 10 has greater mass than the securing member 11, and the whole arrangement comprising lever 9, inertia member 10 and securing member 11 is arranged on the bolt 8, in the position of rest shown, in a manner that is very largely balanced in relation to the effects of gravity. To stabilize this position even against low inertia forces, especially parallel to the direction of the arrow V, a compression/tension spring 12 is provided between support slide 4 and lever 9 and is relaxed in the position of rest shown.

In a modified example of the embodiment, securing member 11 and/or inertia member 10 are designed integrally with the lever 9 or integrated into the latter.

In a normal, slow movement of the slatted roof section 2 or of the support slide 4 relative to the guide 3, and with the customary accelerations and decelerations of the motor vehicle in normal operation, the fixing device 5 substantially retains its position of rest as shown. In the event of a disproportionate deceleration of the vehicle caused by a vehicle collision, torques are created as a result of differing decelerations of the vehicle, the support slide 4 and the inertia member 10. These torques act on the fixing device, causing a twisting of the lever 9 about the bolt 8, in other words a deflection of the lever 9 out of the rest position. As a result of the selected mass distribution, which assigns the inertia member 10 a greater mass than the securing member 11, a counter-clockwise torque results in relation to the bolt 8. The torque overcomes the counteracting force of the appropriately dimensioned spring 12 and moves the securing member 11 into its operating position, in which it presses against a friction surface 13 arranged fixed to the vehicle.

The securing member 11 is designed as a friction member in the region of its underside 11b and the friction surface 13 is designed correspondingly and extending parallel to the guide 3 in the longitudinal direction of the vehicle. The friction surface 13 is preferably designed integrally with the guide 3. The fixing device 5 and, in particular, the securing member 11 are furthermore arranged so that the underside 11b of the securing member 11 can enter into contact with the largest possible surface area of the friction surface 13.

When the securing member 11 is in its operating position, it brakes or dampens, by non-positive fitting, any translatory movement of the associated support slide 4. This effect is intensified as a result of the proposed geometrical arrangement, since the support slide is additionally jammed in the guide 4.

A recess 14 is also provided in the friction surface 13, into which recess the securing member 11 can engage with positive fitting. In this case, the securing member 11 acts as a latching member, having a front end surface 11a. End surface 11a butts against a stop surface 14a in the operating position of the securing member relative to the direction of travel V of the motor vehicle. In this case, the securing member is held in the recess 14 by positive fitting and blocks a movement of the support slide 4 along the guide 3.

The fixing device 5 according to the present invention automatically brakes and/or blocks, in the event of a disproportionate vehicle deceleration caused by a collision, a possible undesired movement of the support slide 4 and of the slatted roof section 2 connected thereto. It is notable for a short response time, since it reacts directly to the deceleration of the vehicle. Each slatted roof section 2 can be assigned a recess 14 in a particular position, for example that position in which the slatted roof is completely opened, so that, with the aid of the fixing device 5, the corresponding slatted roof section can be blocked in that position by positive fitting. The fixing device 5 can be individually adapted to the associated roof section 2, so that different roof sections can be provided with differently dimensioned fixing devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roof arrangement for a roof aperture of a motor vehicle, comprising at least one roof section mounted on at least one guide so as to move in a longitudinal direction of the vehicle, wherein the at least one roof section is provided with a fixing device which secures the roof section relative to the guide by engaging a latching recess surface and a friction braking surface, each of said surfaces capable of securing the roof section in the event of a vehicle deceleration caused by a collision.

2. A roof arrangement for a roof aperture of a motor vehicle, comprising at least one roof section mounted on at least one guide so as to move in a longitudinal direction of the vehicle,
wherein the at least one roof section is provided with a fixing device which secures the roof section relative to the guide by latching and friction braking in the event of a vehicle deceleration caused by a collision, and
wherein the fixing device comprises a securing member mounted to move relative to the roof section and, in the event of a vehicle deceleration caused by a collision, is deflected out of a rest position to engage on the guide.

3. A roof arrangement according to claim 2, further wherein the securing member is mounted to move by pivoting about a bolt oriented in a transverse direction of the vehicle.

4. A roof arrangement according to claim 2, wherein the securing member is designed as a friction brake having a side engaging the guide, which is a friction surface extending in the longitudinal direction of the vehicle.

5. A roof arrangement according to claim 2, wherein the securing member is designed as a latching member having a side adapted to positively engage a recess in the guide.

6. A roof arrangement according to claim 1, wherein the fixing device includes an inertia member mounted to move relative to the roof section and, in the event of a vehicle deceleration caused by a collision, is deflected by mass inertia forces out of a rest position.

7. A roof arrangement for a roof aperture of a motor vehicle, comprising at least one roof section mounted on at least one guide so as to move in a longitudinal direction of the vehicle,
wherein the at least one roof section is provided with a fixing device which secures the roof section relative to the guide by latching and friction braking in the event of a vehicle deceleration caused by a collision,
wherein the fixing device includes an inertia member mounted to move relative to the roof section and, in the event of a vehicle deceleration caused by a collision, is deflected by mass inertia forces out of a rest position, and
wherein the fixing device includes a lever pivotably mounted on a bolt oriented in the transverse direction of the vehicle, wherein the inertia element is arranged at a distance from the bolt in a vertical direction of the vehicle.

8. A roof arrangement according to claim 7, wherein a securing member is arranged on the lever.

9. A roof arrangement according to claim 1, wherein the at least one roof section is mounted on the guide via a support slide.

10. A roof arrangement for a roof aperture of a motor vehicle, comprising at least one roof section mounted on at least one guide so as to move in a longitudinal direction of the vehicle,
wherein the at least one roof section is provided with a fixing device which secures the roof section relative to the guide by latching and friction braking in the event of a vehicle deceleration caused by a collision,
wherein the at least one roof section is mounted on the guide via a support slide, and
wherein the fixing device is arranged on the support slide.

11. A roof arrangement according to claim 3, wherein the securing member is designed as a friction brake having a side engaging the guide, which is a friction surface extending in the longitudinal direction of the vehicle.

12. A roof arrangement according to claim 3, wherein the securing member is designed as a latching member having a side adapted to positively engage a recess in the guide.

13. A roof arrangement according to claim 4, wherein the securing member is designed as a latching member having a side adapted to positively engage a recess in the guide.

14. A roof arrangement according to claim 2, wherein the fixing device includes an inertia member mounted to move relative to the roof section and, in the event of a vehicle deceleration caused by a collision, is deflected by mass inertia forces out of a rest position.

15. A roof arrangement according to claim 3, wherein the fixing device includes an inertia member mounted to move relative to the roof section and, in the event of a vehicle deceleration caused by a collision, is deflected by mass inertia forces out of a rest position.

16. A roof arrangement according to claim 4, wherein the fixing device includes an inertia member mounted to move relative to the roof section and, in the event of a vehicle deceleration caused by a collision, is deflected by mass inertia forces out of a rest position.

17. A roof arrangement according to claim 5, wherein the fixing device includes an inertia member mounted to move relative to the roof section and, in the event of a vehicle deceleration caused by a collision, is deflected by mass inertia forces out of a rest position.

18. A securing arrangement for a moveable roof of a motor vehicle, comprising:
a guide which in use operably slidably receives at least one movable roof section; and
at least one securing member connected to a lever mounted so as to pivot about a connection arranged in a transverse direction of the motor vehicle upon vehicle deceleration, the at least one securing member and lever being positioned so as to operably exert a braking force on the guide upon pivoting to prevent undesired movement of the at least one moveable roof section.

19. A motor vehicle having a moveable roof, comprising:
a guide which in use operably slidably receives at least one moveable roof section; and
a fixing device connected to the at least one moveable roof section; the fixing device further comprising;
at least one securing member connected to a lever mounted so as to pivot about a connection arranged in a transverse direction of the motor vehicle upon vehicle deceleration, the at least one securing member and lever being positioned so as to operably engage a friction brake on the guide upon pivoting to prevent undesired movement of the at least one moveable roof section.

20. A roof arrangement for a roof aperture of a motor vehicle, comprising at least one roof section mounted on at least one guide so as to move in a longitudinal direction of the vehicle, wherein the at least one roof section is provided with a fixing device which secures the roof section relative to the guide in the event of a vehicle deceleration caused by a collision,
wherein the fixing device comprises a securing member mounted to move relative to the roof section and, in the event of a vehicle deceleration caused by a collision, is deflected out of a rest position to engage on the guide, and
wherein the securing member is mounted to move by pivoting about a bolt oriented in a transverse direction of the vehicle.

21. A roof arrangement for a roof aperture of a motor vehicle, comprising at least one roof section mounted on at least one guide so as to move in a longitudinal direction of the vehicle, wherein the at least one roof section is provided with a fixing device which secures the roof section relative to the guide in the event of a vehicle deceleration caused by a collision, wherein the fixing device comprises a securing member mounted to move relative to the roof section and, in the event of a vehicle deceleration caused by a collision, is deflected out of a rest position to engage on the guide, and wherein the securing member is designed as a friction brake having a side engaging the guide, which is a friction surface extending in the longitudinal direction of the vehicle.

22. A roof arrangement for a roof aperture of a motor vehicle, comprising at least one roof section mounted on at least one guide so as to move in a longitudinal direction of the vehicle, wherein the at least one roof section is provided with a fixing device which secures the roof section relative to the guide in the event of a vehicle deceleration caused by a collision, wherein the fixing device includes an inertia member mounted to move relative to the roof section and, in the event of a vehicle deceleration caused by a collision, is deflected by mass inertia forces out of a rest position, and wherein the fixing device includes a lever pivotably mounted on a bolt oriented in the transverse direction of the vehicle, wherein the inertia element is arranged at a distance from the bolt in a vertical direction of the vehicle.

23. A roof arrangement according to claim 22, wherein the fixing device includes a securing member on the lever.

24. A roof arrangement according to claim 23, wherein the securing member is designed as a friction brake having a side engaging the guide, which is a friction surface extending in the longitudinal direction of the vehicle.

25. A roof arrangement according to claim 23, wherein the securing member is designed as a latching member having a side adapted to positively engage a recess in the guide.

26. A roof arrangement according to claim 21, wherein the securing number is desiged as a latching member having a side adapted to positively engage a recess in the guide.

27. A roof arrangement according to claim 20, wherein the fixing device includes an inertia member mounted to move relative to the roof section and, in the event of a vehicle deceleration caused by a collision, is deflected by mass inertia forces out of a rest position.

28. A roof arrangement according to claim 21, wherein the fixing device includes an inertia member mounted to move relative to the roof section and, in the event of a vehicle deceleration caused by a collision, is deflected by mass inertia forces out of a rest position.

* * * * *